United States Patent [19]
Estes et al.

[11] Patent Number: 5,933,898
[45] Date of Patent: Aug. 10, 1999

[54] PORTABLE WHEELCHAIR RAMP

[76] Inventors: Kenneth Wayne Estes; Lorinda Lee Estes, both of 170 N. Fairfield Ave., Susanville, Calif. 96130

[21] Appl. No.: 08/922,092

[22] Filed: Sep. 2, 1997

[51] Int. Cl.⁶ ............................................ E01D 1/00
[52] U.S. Cl. ................................................. 14/69.5
[58] Field of Search ............................. 14/69.5; 52/2.12

[56] References Cited

U.S. PATENT DOCUMENTS

| | | | |
|---|---|---|---|
| 2,624,058 | 1/1953 | Kudrna | 14/69.5 |
| 4,833,750 | 5/1989 | Gherling | 14/69.5 X |
| 4,864,672 | 9/1989 | Altieri et al. | 14/69.5 |
| 5,062,174 | 11/1991 | DaSalvo | 14/69.5 |
| 5,277,436 | 1/1994 | Frank et al. | 14/69.5 X |
| 5,325,558 | 7/1994 | Labreche | 14/69.5 |
| 5,347,672 | 9/1994 | Everard et al. | 14/69.5 |
| 5,517,708 | 5/1996 | Baranowski | 14/69.5 |

*Primary Examiner*—Tamara L. Graysay
*Assistant Examiner*—Sunil Singh
*Attorney, Agent, or Firm*—David L. Volk

[57] ABSTRACT

A series of hingedly connected spanning panels is provided. Each spanning panel includes two opposing outer edges. Alternating ones of the spanning panels include a raised ridge disposed along each of the outer edges of the spanning panel. At least one sleeve is disposed along each of the outer edges of a plurality of the spanning panels. A plurality of elongated rods are provided. Each of the rods is configured to pass through a plurality of the sleeves, the rods thereby maintaining the spanning panels in a substantially fixed linear relationship to one another. An end panel is hingedly connected to each end of the series of hingedly connected spanning panels. Each of the end panels is substantially wedge shaped and includes a gripping surface.

13 Claims, 3 Drawing Sheets

PORTABLE WHEELCHAIR RAMP

BACKGROUND OF THE INVENTION

1. Field of the Invention

The present invention relates to ramps, particularly to folding ramps for wheelchairs.

2. Description of the Related Art

There are many public locations which tend to be inaccessible to persons in wheelchairs. Usually this inaccessibility is caused by steps which cannot be traversed by a wheelchair, with no ramp nearby to provide alternative access.

What is needed is a ramp which is easily folded and unfolded for use, which provides sufficient length to keep the incline angle to a minimum, and which is rigid and safe when being used.

SUMMARY OF THE INVENTION

The foldable, portable wheelchair ramp of the present invention includes a series of hingedly connected spanning panels. Each spanning panel includes two opposing outer edges. Alternating ones of the spanning panels include a raised ridge disposed along each of the outer edges of the spanning panel. At least one sleeve is disposed along each of the outer edges of a plurality of the spanning panels. A plurality of elongated rods are provided. Each of the rods is configured to pass through a plurality of the sleeves, the rods thereby maintaining the spanning panels in a substantially fixed linear relationship to one another. An end panel is hingedly connected to each end of the series of hingedly connected spanning panels. Each of the end panels is substantially wedge shaped and includes a gripping surface.

Because raised ridges are provided, the wheels of a wheelchair are restrained from going off the edge of the ramp.

Because the ridges are provided on alternating spanning panels, alternating spanning panels may fold against each other without the ridges interfering with each other.

Because of the sleeves and rods, the spanning panels may be maintained in a rigid, fixed position when the ramp is unfolded.

Still further features and advantages will become apparent from the ensuing description and drawings.

DETAILED DESCRIPTION

Figure 1:
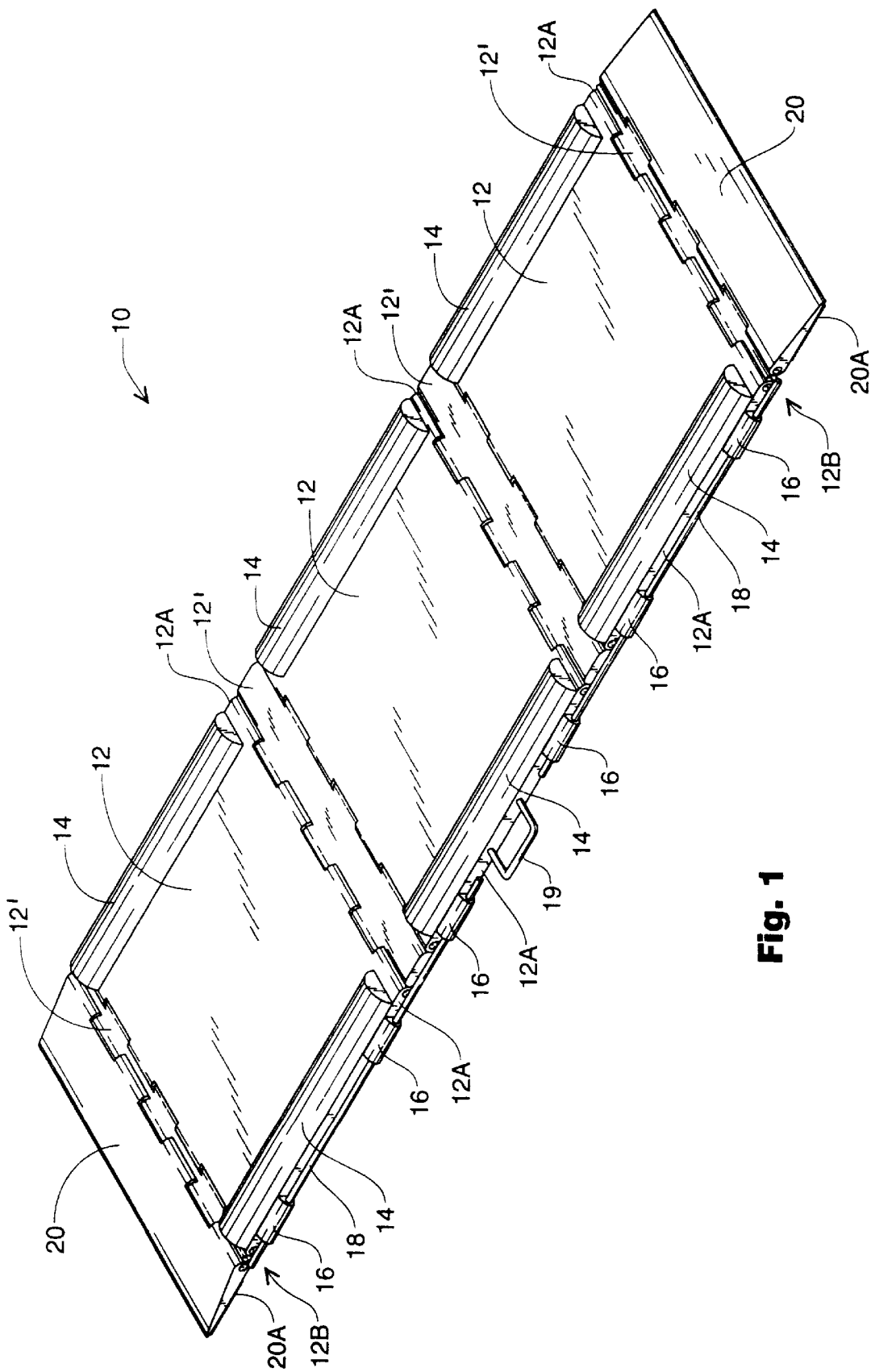
FIG. 1 is a perspective view of a foldable ramp of the present invention.
Figure 2:
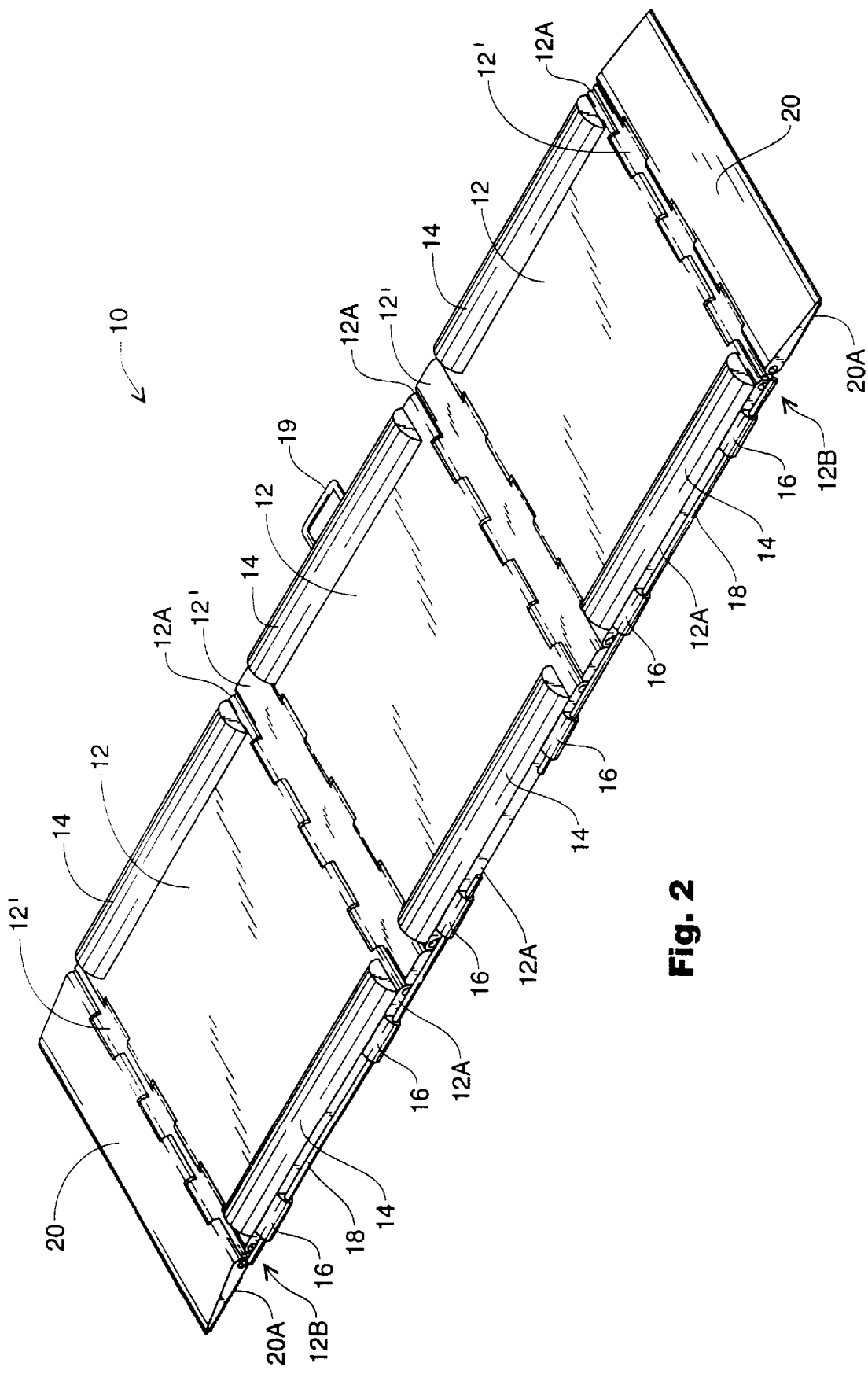
FIG. 2 is a perspective view of the ramp, taken from a different viewpoint.

FIG. 1 is a perspective view of a foldable wheelchair ramp 10 of the present invention. FIG. 2 is a perspective view of the ramp 10, taken from a different viewpoint. Referring to FIGS. 1–2, the ramp 10 includes a series of hingedly connected spanning panels 12, 12'. Each spanning panel 12, 12' includes two opposing outer edges 12A. Alternating ones of the spanning panels 12 include a raised ridge 14 disposed along each of the outer edges 12A of the spanning panel 12.

Sleeves 16 are disposed along each of the outer edges 12A of alternating ones of the spanning panels 12. A plurality of elongated rods 18 are provided. Each of the rods 18 is configured to pass through the sleeves 16 of two of the spanning panels 12, the rods 18 thereby maintaining the spanning panels 12 in a substantially fixed linear relationship to one another. A handle 19 is provided on the center spanning panel 12, for carrying the ramp 10 when the ramp 10 is in a folded position.

An end panel 20 is hingedly connected to each end 12B of the series of hingedly connected spanning panels 12, 12'. Each of the end panels 20 is substantially wedge shaped and includes a gripping surface 20A.

Figure 3:
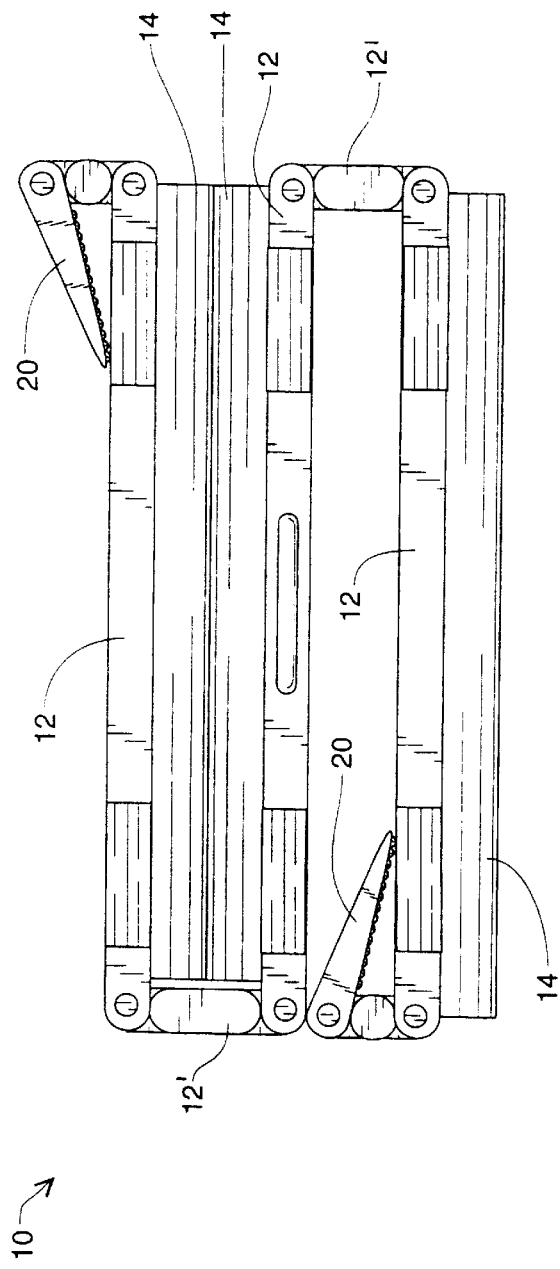
FIG. 3 is a side elevational view of the ramp in a folded position.

FIG. 3 is a side elevational view of the ramp 10 in a folded position. The spanning panels 12' which do not include the ridges 14, each have a length appropriate for the ramp 10 to fold together in such a manner that the spanning panels 12 which include the ridges 14 are parallel to one another. This configuration permits the ramp 10 to be folded together in as compact a manner as possible.

Figure 4:
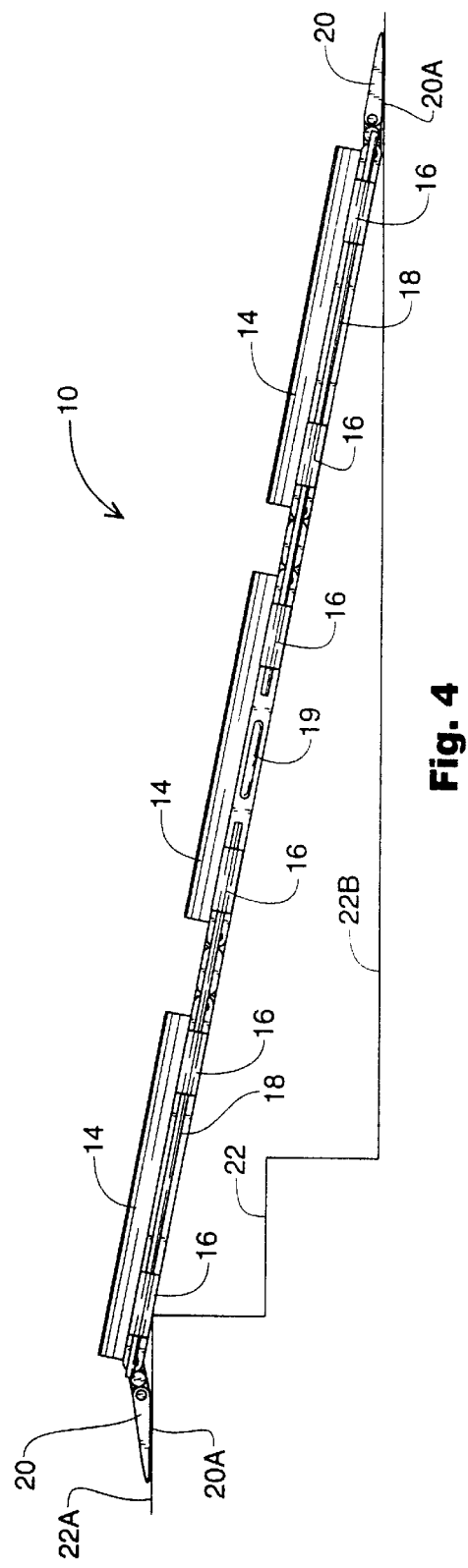
FIG. 4 is a side elevational view of the ramp in an unfolded position and ready for use.

FIG. 4 is a side elevational view of the ramp 10 in an unfolded position and ready for use. One of the end panels 20 is placed at a top 22A of a set of stairs 22. The other of the end panels 20 is placed at a bottom 22B of a set of stairs 22. The gripping surfaces 20A help to maintain the ramp 10 in a fixed position.

The foregoing description is included to describe embodiments of the present invention which include the preferred embodiment, and is not meant to limit the scope of the invention. From the foregoing description, many variations will be apparent to those skilled in the art that would be encompassed by the spirit and scope of the invention. Accordingly, the scope of the invention is to be limited only by the following claims and their legal equivalents.

The invention claimed is:

1. A foldable ramp comprising a series of alternatingly, hingedly connected first and second spanning panels, each first and second spanning panel having two opposing outer edges, each of the first spanning panels including a raised ridge disposed along each of the outer edges thereof, locking means for maintaining the first spanning panels in a substantially fixed linear relationship to one another, and a handle on one of the first spanning panels, wherein the ramp is configured to fold for carrying such that the first spanning panels are parallel to each other, pairs of the raised ridges are parallel to and touching each other, and the second spanning panels are perpendicular to the first spanning panels.

2. The ramp of claim 1, wherein the series of hingedly connected first and second spanning panels has two ends, and further comprising an end panel hingedly connected to each of the two ends.

3. The ramp of claim 2, wherein each of the end panels includes a gripping surface.

4. The ramp of claim 3, wherein each of the end panels is substantially wedge shaped.

5. The ramp of claim 1, wherein the locking means comprises at least one rigid member configured to connect to a plurality of the first spanning panels.

6. The ramp of claim 5, wherein the series of hingedly connected first and second spanning panels has two ends, and further comprising an end panel hingedly connected to each of the two ends.

7. The ramp of claim 6, wherein each of the end panels includes a gripping surface.

8. The ramp of claim 7, wherein each of the end panels is substantially wedge shaped.

9. The ramp of claim 1, wherein the locking means comprises sleeves disposed along each of the outer edges of each of the first spanning panels, and a plurality of elongated rods, each of the rods configured to pass through the sleeves of two of the first spanning panels.

10. The ramp of claim 9, wherein the series of hingedly connected first and second spanning panels has two ends, and further comprising an end panel hingedly connected to each of the two ends.

11. The ramp of claim 10, wherein each of the end panels includes a gripping surface.

12. The ramp of claim 11, wherein each of the end panels is substantially wedge shaped.

13. A foldable ramp comprising:

a. a series of alternatingly, hingedly connected first and second spanning panels;
 b. each first and second spanning panel having two opposing outer edges;
 c. each of the first spanning panels including a raised ridge disposed along each of the outer edges thereof, each of the second spanning panels being devoid of raised structure along the outer edges thereof;
 d. sleeves disposed along each of the outer edges of each of the first spanning panels, and a plurality of elongated rods, each of the rods configured to pass through the sleeves of two of the first spanning panels, the rods thereby maintaining the first spanning panels in a substantially fixed linear relationship to one another;
 e. a handle on one of the first spanning panels, wherein the ramp is configured to fold for carrying such that the first spanning panels are parallel to each other, pairs of the raised ridges are parallel to and touching each other, and the second spanning panels are perpendicular to the first spanning panels;
 f. the series of hingedly connected first and second spanning panels having two ends;
 g. an end panel hingedly connected to each of the two ends; and
 h. each of the end panels being substantially wedge shaped and including a gripping surface.

* * * * *